(12) United States Patent
Craig

(10) Patent No.: US 12,368,780 B2
(45) Date of Patent: *Jul. 22, 2025

(54) BREWER COMMUNICATION SYSTEM AND METHOD

(71) Applicant: BUNN-O-MATIC CORPORATION, Springfield, IL (US)

(72) Inventor: Joshua T. Craig, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,391

(22) Filed: Mar. 25, 2024

(65) Prior Publication Data

US 2024/0236187 A1    Jul. 11, 2024

Related U.S. Application Data

(63) Continuation of application No. 17/213,497, filed on Mar. 26, 2021, now Pat. No. 11,943,299.

(Continued)

(51) Int. Cl.
*H04L 12/70* (2013.01)
*H04B 3/54* (2006.01)
(Continued)

(52) U.S. Cl.
CPC ............... *H04L 67/12* (2013.01); *H04B 3/54* (2013.01); *H04W 4/70* (2018.02)

(58) Field of Classification Search
CPC ............ H04L 67/12; H04B 3/54; H04W 4/70; H04W 4/80
(Continued)

(56) References Cited

U.S. PATENT DOCUMENTS

| 5,350,082 A | 9/1994 | Kiriakides, Jr. et al. |
| 5,491,463 A | 2/1996 | Sargeant |

(Continued)

FOREIGN PATENT DOCUMENTS

| CN | 106264149 | 1/2017 |
| CN | 107067556 | 8/2017 |

(Continued)

OTHER PUBLICATIONS

Bevi, "Bevi Offers New Touchless Beverage Dispensing Feature," Retrieved from the Internet at: https://www.vendingmarketwatch.com/beverage/news/21142193/bevi-offers-new-touchless-beverage-dispensing-feature, (Jun. 15, 2020).

(Continued)

*Primary Examiner* — Ario Etienne
*Assistant Examiner* — Elizabeth Kassa
(74) *Attorney, Agent, or Firm* — Barnes & Thornburg LLP

(57) ABSTRACT

A brewing device, a stand, and server for remotely monitoring a brewed beverage's status. The stand and/or server includes a wireless communication subsystem to establish wireless communications with a remote brewing device. The stand and/or brewer may wirelessly send one or more of the status updates regarding the brewed beverage server to the remote brewing device with the wireless communication subsystem. The remote brewer device establishes a user interface from which the status updates can be viewed by mobile device(s) wirelessly connected to the brewer device.

11 Claims, 9 Drawing Sheets

Related U.S. Application Data

(60) Provisional application No. 63/000,033, filed on Mar. 26, 2020.

(51) Int. Cl.
    *H04L 67/12* (2022.01)
    *H04W 4/70* (2018.01)

(58) Field of Classification Search
    USPC ......................................................... 709/219
    See application file for complete search history.

(56) References Cited

U.S. PATENT DOCUMENTS

| | | | |
|---|---|---|---|
| 6,587,739 B1* | 7/2003 | Abrams ................. | G05B 15/02 7/110 |
| 7,032,818 B2 | 4/2006 | Thomas et al. | |
| 7,578,415 B2 | 8/2009 | Ziesel et al. | |
| 7,866,509 B2 | 1/2011 | Ziesel | |
| 7,881,822 B2 | 2/2011 | Thornton et al. | |
| 8,771,774 B2 | 7/2014 | Miller | |
| 8,820,580 B2 | 9/2014 | Ziesel | |
| 9,253,264 B2 | 2/2016 | Robinson et al. | |
| 9,334,150 B1 | 5/2016 | Ost et al. | |
| 9,394,154 B2 | 7/2016 | Connerat et al. | |
| 9,495,673 B2 | 11/2016 | Cameron et al. | |
| 9,713,399 B2 | 2/2017 | Boone et al. | |
| 9,646,314 B2 | 5/2017 | Moore et al. | |
| 9,701,530 B2 | 7/2017 | Kline et al. | |
| 9,721,060 B2 | 8/2017 | Chung et al. | |
| 9,764,935 B2 | 9/2017 | Jersey et al. | |
| 9,840,407 B2 | 12/2017 | Difatta et al. | |
| 9,883,377 B2 | 1/2018 | Cheng | |
| 9,910,502 B2 | 3/2018 | Geurts et al. | |
| 10,121,306 B2 | 11/2018 | Peters et al. | |
| 10,143,331 B1 | 12/2018 | Heys et al. | |
| 10,365,620 B1 | 7/2019 | Raeber et al. | |
| 10,453,461 B1 | 10/2019 | Mutagi et al. | |
| 10,579,958 B2 | 3/2020 | Gray et al. | |
| 10,602,334 B2 | 3/2020 | Kim | |
| 10,631,558 B2 | 4/2020 | White et al. | |
| 11,059,713 B1 | 7/2021 | Connor | |
| 11,084,703 B2 | 8/2021 | Peters et al. | |
| 11,087,376 B2 | 8/2021 | Cuppari et al. | |
| 2002/0011923 A1 | 1/2002 | Cunningham | |
| 2003/0079613 A1* | 5/2003 | Williamson ............ | A47J 31/52 99/280 |
| 2003/0084047 A1 | 5/2003 | Williamson | |
| 2006/0293956 A1 | 12/2006 | Walker et al. | |
| 2007/0086514 A1* | 4/2007 | Lawrence ................. | H04B 3/54 375/219 |
| 2010/0326562 A1 | 12/2010 | Sheehy et al. | |
| 2011/0052766 A1* | 3/2011 | Knepler ................. | A47J 31/002 99/275 |
| 2013/0195088 A1 | 8/2013 | Ho | |
| 2013/0275957 A1 | 10/2013 | Villar et al. | |
| 2014/0100942 A1 | 4/2014 | Konevic | |
| 2014/0211099 A1* | 7/2014 | Saha ...................... | H04W 4/021 348/734 |
| 2014/0263415 A1 | 9/2014 | San Miguel et al. | |
| 2014/0267094 A1 | 9/2014 | Hwang et al. | |
| 2015/0039776 A1 | 2/2015 | Jarnagin, III | |
| 2015/0082243 A1 | 3/2015 | Taylor et al. | |
| 2015/0178721 A1 | 6/2015 | Pandiarajan | |
| 2015/0297022 A1 | 10/2015 | Guard | |
| 2016/0045064 A1* | 2/2016 | Lopez .................. | A47J 36/2466 219/438 |
| 2016/0165660 A1* | 6/2016 | Delamare ................ | H04B 3/54 455/41.1 |
| 2016/0321447 A1 | 11/2016 | Lancioni | |
| 2016/0325980 A1 | 11/2016 | Sawhney et al. | |
| 2017/0046903 A1* | 2/2017 | Knepler ................. | G06Q 50/12 |
| 2017/0081163 A1 | 3/2017 | Gatipon et al. | |
| 2017/0099981 A1 | 4/2017 | Haidar | |
| 2017/0331899 A1* | 11/2017 | Binder .................... | G07C 3/02 |
| 2017/0360250 A1* | 12/2017 | Spencer ................. | A47J 31/04 |
| 2018/0095439 A1* | 4/2018 | Karbasian .......... | G05B 19/0426 |
| 2018/0138945 A1* | 5/2018 | Kearney ................ | G05B 15/02 |
| 2018/0168385 A1* | 6/2018 | Boone ................ | G06Q 30/0621 |
| 2018/0211235 A1 | 7/2018 | Geigel et al. | |
| 2018/0262589 A1* | 9/2018 | Spina .................... | H04L 67/566 |
| 2018/0288594 A1 | 10/2018 | Kim | |
| 2019/0108709 A1 | 4/2019 | Yamazaki et al. | |
| 2019/0117011 A1* | 4/2019 | Magatti ............... | A47J 31/5255 |
| 2019/0172297 A1 | 6/2019 | Schwarber et al. | |
| 2019/0207650 A1* | 7/2019 | Kearney ................. | H04B 3/54 |
| 2019/0259077 A1 | 8/2019 | Cuppari et al. | |
| 2019/0279181 A1 | 9/2019 | Kelly et al. | |
| 2019/0308866 A1 | 10/2019 | Sawhney et al. | |
| 2020/0031656 A1 | 1/2020 | Rudick et al. | |
| 2020/0129004 A1 | 4/2020 | Hanes | |
| 2020/0327766 A1 | 10/2020 | Wilkinson | |
| 2020/0375388 A1 | 12/2020 | MacFarlane | |
| 2021/0022547 A1* | 1/2021 | Stork genannt Wersborg ............. A47J 31/525 |
| 2021/0181892 A1 | 6/2021 | Rudick | |
| 2021/0371266 A1 | 12/2021 | Connor | |

FOREIGN PATENT DOCUMENTS

| | | |
|---|---|---|
| CN | 108392076 | 8/2018 |
| EP | 3505021 | 7/2019 |
| EP | 3616575 | 3/2020 |
| IN | 201931033033 | 9/2019 |
| JP | 6186488 | 8/2017 |
| WO | WO 2015/167846 | 11/2015 |
| WO | WO 2017/146991 | 8/2017 |
| WO | WO 2020/132457 | 6/2020 |
| WO | WO 2021/247421 | 12/2021 |

OTHER PUBLICATIONS

Bunn, Bunn Introduces VirtualTouch, Retrieved from the Internet at: https://www.vendingmarketwatch.com/coffee-service/news/21148461/bunn-introduces-virtualtouch (Jul. 31, 2020).

Bunn-O-Matic Corporation, "ADA Standards for Accessible Design," Brochure (Mar. 15, 2012).

Cafection, "Sophia Touchless Solutions in Action," Retrieved from the Internet at: https://www.youtube.com/watch?v32 nt0zUIHaxel &feature=emb_title, (Youtube Video uploaded May 20, 2020).

Carimali, "Touchless Solutions," accessed via the Internet at: https://www.carimali.com/en/press-and-media/video/touchless-solutions/ (Jun. 24, 2020).

Coca-Cola Company, "Coca-Cola rolls out contactless Freestyle beverage dispenser," accessed via the Internet at: https://www.vendingtimes.com/news/coca-cola-co-rolls-out-contactless-freestyle-beverage-dispenser/ (Jul. 13, 2020).

De Jong Duke, "ConnectMe—Keeps you Informed," accessed via the Internet at: https://www.dejongduke.us/products/connectme-option/ (believed to be publically available by May 18, 2021).

Elkay Manufacturing Company Corp., "Smartwell® Touchless Beverage Dispenser," accessed via the Internet at: https://www.vendingmarketwatch.com/coffee-service/water-equipment-coolers-filters-accessories-etc/product/21152498/elkay-smartwell-touchless-beverager-dispenser (Aug. 31, 2020).

Jura Elektroapparate AG, "J.O.E.® brings state-of-the-art operation to your smartphone," accessed via the Internet at: https://us.jura.com/en/homeproducts/accessories/JOE?utm_source=redir&utm_medium=US&utm_content=US-en&utm_campaign=joe#&gid=undefined&pid=2 (believed to be publically available by May 18, 2021).

Lavazza, "Flavia Creation 600," accessed via the Internet at: https://www.vendingtimes.com/news/lavazza-to-launch-hygienic-brewer/ (Jul. 17, 2020).

Nespresso Professional, "New Features for Safer Coffee Moments," accessed via the Internet at: https://www.nespresso.com/pro/de/en/momento-touchless (believed to be publically available by May 18, 2021).

(56) References Cited

OTHER PUBLICATIONS

Newco Enterprises, "Newco Touchless Solutions," accessed via the Internet at: https://www.newcocoffee.com/newco-touchless-solutions/ (Jul. 13, 2020).

Schaerer AG, "Touchless Coffee Schaerer Soul QR Demo," accessed via the Internet at: https://www.youtube.com/watch?v=4w1mhGYjVPY (Nov. 3, 2020).

Search Report & Written Opinion issued in Int'l Appl. No. PCT/US2021/032988 (2021).

Sestra Systems, "Touchless Smart Dispensing," accessed via the Internet at: https://www.sestrasystems.com/touchless/ (believed to be publically available by May 18, 2021).

Thermoplan AG, "Touchless Coffee Enjoyment," Brochure (Jul. 15, 2021).

* cited by examiner

BREWER COMMUNICATION SYSTEM AND METHOD

RELATED APPLICATIONS

This is a continuation of U.S. application Ser. No. 17/213,497 filed Mar. 26, 2021 for a "Brewer Communication System and Method" (now U.S. Pat. No. 11,943,299), which claimed the benefit of U.S. Provisional Application Ser. No. 63/000,033 filed Mar. 26, 2020, for a "Brewer Communication System and Method," which are both hereby incorporated by reference in their entireties.

BACKGROUND

The present disclosure relates to brewer devices for making coffee, tea and the like. After brewing a beverage, often times the servers are placed on stands in remote locations from the brewer. This can create difficulties managing the servers, such as knowing when servers are empty or when the brewed beverage is no longer fresh. Therefore, there is a need for a technology that facilitates remote monitoring of servers.

SUMMARY

According to one aspect, this disclosure provides a stand for a brewed beverage server. The stand includes a platform for holding a brewed beverage server. There is at least one power port configured to supply power to a brewed beverage server connected to the at least one power port. The stand has a power line communication subsystem configured to establish data communications with the brewed beverage server connected to the at least one power port to receive one or more status updates regarding the brewed beverage server. The stand includes a wireless communication subsystem configured to establish wireless communications with a remote brewing device. Also, there is a controller programmed to wirelessly send one or more of the status updates regarding the brewed beverage server received via the power line communication subsystem to the remote brewing device with the wireless communication subsystem.

According to another aspect, this disclosure provides a brewing device with a network connection manager, a brewing operation manager, a monitoring manager, and a user interface manager. The network connection manager is configured to establish a wireless network connection with one or more mobile computing devices and one or more remote stands. The brewing operation manager is configured to facilitate brewing of a brewed beverage. The monitoring manager is configured to receive one or more status updates from the one or more remote stands regarding one or more brewed beverage servers. The user interface manager is configured to establish a user interface from which the one or more mobile computing devices can view the one or more status updates regarding the one or more brewed beverage servers.

According to a further aspect, this disclosure provides a server for a brewed beverage. The server includes a container defining a chamber dimensioned to receive a brewed beverage. There is a power cord configured to plug into a power port of a stand to supply electrical power to the server. The server has a controller and a power line communication subsystem and/or wireless communication subsystem. The controller is configured to control a temperature of the brewed beverage in the chamber. In some embodiments, the power line communication subsystem is configured to establish data communications with the stand over the power cord. Embodiments are contemplated in which the server periodically wirelessly transmits status updates directly to the brewer device.

DETAILED DESCRIPTION OF THE DRAWINGS

Figure 1:
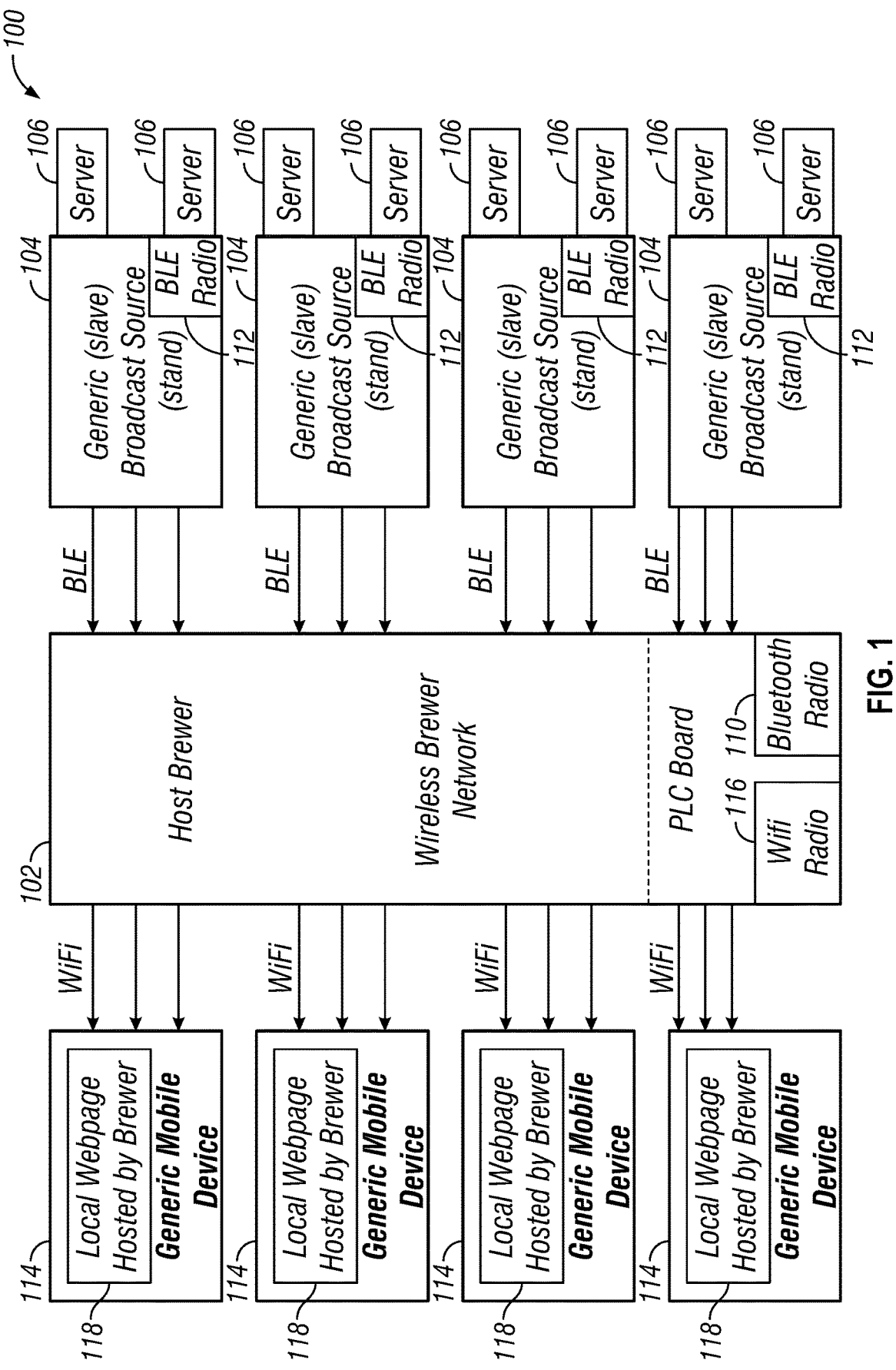
FIG. 1 is a simplified block diagram of at least one embodiment of network that includes a brewing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B);

(C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for remotely monitoring servers of brewed beverages includes, in the embodiment shown, a brewing device 102, a plurality of stands 104 remote from the brewing device 102, and a plurality of servers 106 each with a body defining a chamber containing a brewed beverage on a platform of corresponding stands 104. Although the example shown in FIG. 1 includes a single brewing device 102, multiple brewing devices could be included in the system 100 depending on the circumstances. The term "brewing device" is broadly intended to mean any device that could be used to produce a brewed beverage, such as coffee, tea, tisane, herbal teas, or other beverages. FIG. 1 shows four stands 104 with two servers 106 on each stand for purposes of example, but more or less stands 104 and/or servers 106 could be provided depending on the circumstances.

In the embodiment shown, the plurality of stands 104 are in wireless communication with the brewing device 102, such as using Bluetooth™ low energy communications, to provide status information regarding respective servers 106 connected to the stands 104. For example, the brewing device 102 may include a Bluetooth™ radio 110 that communicates with a Bluetooth™ radio 112 of the stands 104. Although wireless communications between the brewing device 102 and plurality of stands 104 may be Bluetooth™ in some embodiments, numerous other wireless communication protocols could be used depending on the circumstances, including but not limited to Zigbee™, Z-Wave™, and/or Ultra-wide Band (UWB). By way of example only, the stands 104 could provide approximately real-time updates to the brewing device 102 regarding the stands 104 and servers 106, including but not limited to freshness time, empty status, recipe name, serial number, signal strength, batch size, model (e.g., 1.5 gallon vs. 1.0 gallon) and/or location. In some embodiments, the stands 104 may receive updates on server status from the respective servers 106 connected with the stands 104 using wired or wireless communications, such as power line communications (PLC) with servers 106 plugged into stands 104. Although the brewing device 102 is shown to be in wireless communication with the stands 104 in FIG. 1, the servers 106 could include wireless communication circuitry to communicate directly with the brewing device 102 (instead of communicating with the stands 104, which in turn, communicate with the brewing device 102) in some embodiments. For example, the servers 106 could include wireless communication circuitry to communicate with the brewer device 102 using one or more of Bluetooth™, Zigbee™, Z-Wave™, Ultra-wide Band (UWB) and/or other communication protocol. In some such embodiments, the servers 106 could provide approximately real-time updates directly to the brewer 102. In some embodiments in which the servers 106 include wireless communication circuitry to communicate directly with the brewing device 102, the wireless communication circuitry in the stands 104 could be optional. Additionally, in some embodiments, the brewing device 102 may include a port to which the servers 106 could plug in for electrical power and data communications.

As shown, the system 100 includes a plurality of mobile computing devices 114, such as a cell phone, tablet, laptop computer, desktop computer, etc., that are wirelessly connected with the brewing device 102, such as using a Wi-Fi radio 116 or other wireless communications. For example, the brewing device 102 could establish a Wi-Fi hotspot for connection by the plurality of mobile computing devices 108 (without needing an Internet connection in some embodiments). In some cases, the brewing device 102 could host a web interface accessible by a browser 118 on the mobile computing devices 108 that can be used to, among other things, view approximately real-time updates on the status of servers 106 (See FIGS. 10-13). Although FIG. 1 shows four mobile devices 114 in wireless communication with the brewing device 102, more or less mobile devices 114 could be connected with the brewing device 102.

Figure 2:
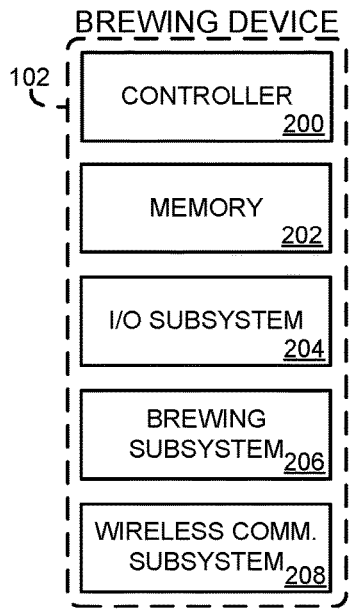
FIG. 2 is a simplified block diagram of at least one embodiment of a brewing device.

FIG. 2 illustrates an embodiment of the brewing device 102. In this example, the brewing device 102 includes a controller 200, memory 202, input/output (I/O) subsystem 204, brewing subsystem 206, and wireless communication subsystem 208. For example, the controller 200 could be any type of processor capable of performing the functions described herein. The controller 200 may be embodied as a single or multi-core processor(s), microcontroller, or other processor or processing/controlling circuit. The memory 202 may be embodied as any type of volatile or non-volatile memory or data storage capable of performing the functions described herein. In operation, the memory 202 may store various data and software used during operation of the brewing device 102. The memory 202 is communicatively coupled to the controller 200 via the I/O subsystem 204, which may be embodied as circuitry and/or components to facilitate input/output operations with the controller 200, the memory 202, and other components of the brewing device 102. The brewing subsystem 206 may be any type of circuitry or components to facilitate brewing a brewed beverage. During operation, the controller 200 may be communicatively coupled to the brewing subsystem 206 to control brewing of brewed beverages. The wireless communication subsystem 208 may be embodied as any communication circuit, device, or collection thereof, capable of enabling wireless communications between the brewing device and other devices, such as the stands 104 and mobile computing devices 114. The wireless communication subsystem 208 may be configured to use any one or more communication technology and associated protocols (e.g., Wi-Fi®, Bluetooth™, WiMAX, 3G, 4G LTE, etc.) to effect such communication. In some embodiments, the memory 202, I/O subsystem 204, and/or wireless communication subsystem 208 may form a portion of a SoC and be incorporated along with the controller 200 and other components of the brewing device 102 on a single integrated circuit chip.

Figure 3:
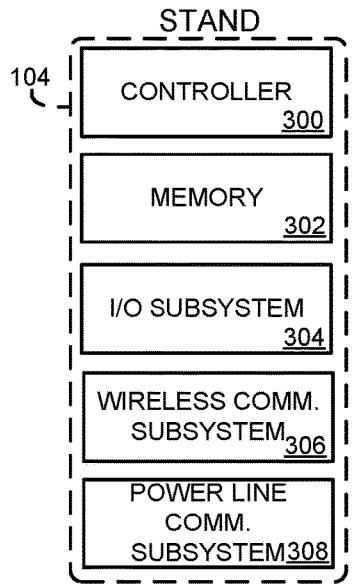
FIG. 3 is a simplified block diagram of at least one embodiment of a stand.

FIG. 3 illustrates an embodiment of the stand 104. In this example, the stand 104 includes a controller 300, memory 302, input/output (I/O) subsystem 304, wireless communication subsystem 306, and power line communication subsystem 308. For example, the controller 300 could be any type of processor capable of performing the functions described herein. The controller 300 may be embodied as a single or multi-core processor(s), microcontroller, or other processor or processing/controlling circuit. The memory 302 may be embodied as any type of volatile or non-volatile memory or data storage capable of performing the functions described herein. In operation, the memory 302 may store various data and software used during operation of the stand 104. The memory 302 is communicatively coupled to the controller 300 via the I/O subsystem 304, which may be embodied as circuitry and/or components to facilitate input/output operations with the controller 300, the memory 302, and other components of the stand 104. The wireless communication subsystem 306 may be embodied as any communication circuit, device, or collection thereof, capable of enabling wireless communications between the stand 104 and brewing device 102. The wireless communication subsystem 306 may be configured to use any one or more communication technology and associated protocols (e.g., Wi-Fi®, Bluetooth™ WiMAX, 3G, 4G LTE, etc.) to effect such communication. As discussed above, the wireless communication subsystem 306 could be optional in embodiments where the servers 106 include wireless communication circuits to report approximately real-time updates directly to the brewer device 102. The power line communication subsystem 308 may be embodied as circuitry for communicating with server(s) plugged into the stand 104 via a power line connection. For example, the stand 104 may include one or more power ports into which servers 106 may connect, which both provides power to the server 106 and establishes data communications with the server 106 over the power line. The server 106 may communicate status information, such as freshness, empty status, location, etc., to the stand 104 via the power line using the power line communication subsystem 308. In some embodiments, the memory 302, I/O subsystem 304, wireless communication subsystem 306 and/or power line communication subsystem 308 may form a portion of a SoC and be incorporated along with the controller 300 and other components of the stand 104 on a single integrated circuit chip.

Figure 4:
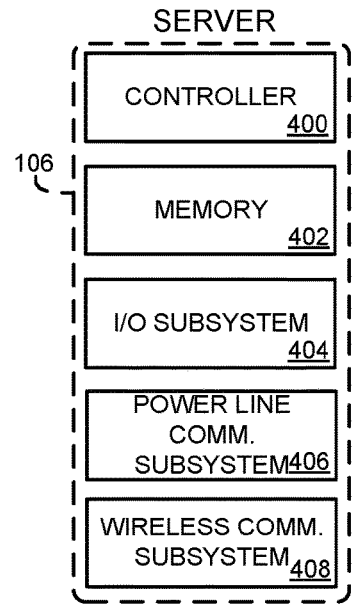
FIG. 4 is a simplified block diagram of at least one embodiment of a server.
Figure 14:
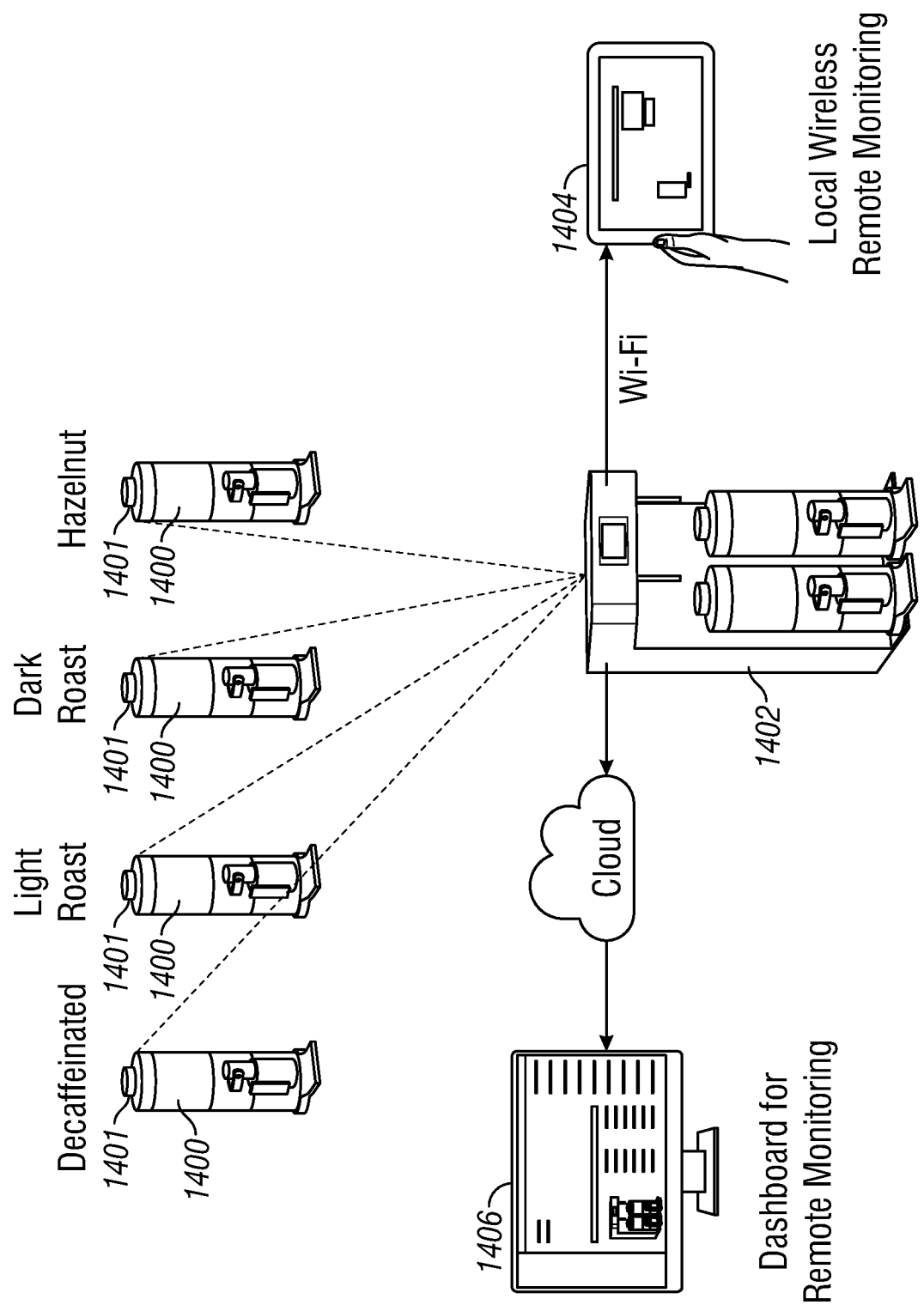
FIG. 14 is a simplified block diagram showing at least one embodiment of one or more servers with a wireless beacon to transmit information directly to a brewing device.

FIG. 4 illustrates an embodiment of the server 106. In this example, the server 106 includes a controller 400, memory 402, input/output (I/O) subsystem 404, power line communication subsystem 406, and wireless communication subsystem 408. In some embodiments, the server has no power, but plugs into an electric docking point on the brewer and/or stand. Once docked, the server monitors temperature of the brewed beverage and provides control of heat to maintain the optimum temperature of the brewed beverage. For example, the brewing device 102 could be set up in a separate location and once brewing is complete, the server 106 could be undocked and taken to the desired service location. A remote stand 104 can be placed in service areas that are not ideal for brewer setup. Once connected to the remote stand 104, the server 106 has the capability of communicating and exchanging data, such as freshness time, empty status, hold temperature, recipe name, serial number, signal strength, batch size, model (e.g., 1.5 gallon vs. 1.0 gallon), etc., over the power line that is docked to the stand 104. In some embodiments, such as shown in FIG. 14, the server 106 is configured to wirelessly communicate status information directly with the brewer device 102, such as using Bluetooth™ communications. For example, the server 106 may include internal batteries to power the wireless communication subsystem 408, and could be configured to periodically or approximately in real-time transmit wireless updates on, among other things, freshness time, empty status, hold temperature, recipe name, serial number, signal strength, batch size, model (e.g., 1.5 gallon vs. 1.0 gallon), location, etc. to the brewer device 102, which could then provide such information to the mobile devices 114.

The controller 400 could be any type of processor capable of performing the functions described herein. The controller 400 may be embodied as a single or multi-core processor(s), microcontroller, or other processor or processing/controlling circuit. The memory 402 may be embodied as any type of volatile or non-volatile memory or data storage capable of performing the functions described herein. In operation, the memory 402 may store various data and software used during operation of the server 106. The memory 402 is communicatively coupled to the controller 400 via the I/O subsystem 404, which may be embodied as circuitry and/or components to facilitate input/output operations with the controller 400, the memory 402, and other components of the server 106. The power line communication subsystem 406 may be embodied as circuitry for communicating with stand 104 when the server 106 is plugged into the stand 104 via a power line connection. For example, the server 106 may include a power cord that plugs into a power port on the stand 104, which both provides power to the server 106 and establishes data communications with the stand 104 over the power line. The server 106 may communicate status information, such as freshness, empty status, location, etc., to the stand 104 via the power line using the power line communication subsystem 405. In some embodiments, the memory 402, I/O subsystem 404, power line communication subsystem 406, and/or wireless communication subsystem 408 may form a portion of a SoC and be incorporated along with the controller 400 and other components of the server 106 on a single integrated circuit chip.

Figure 5:
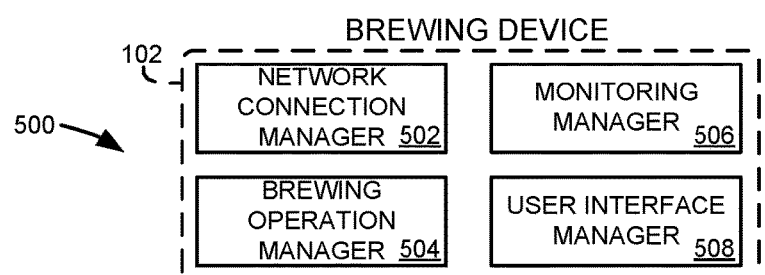
FIG. 5 is a simplified block diagram of various environments of a brewing device of FIG. 2.

Referring now to FIG. 5, in an illustrative embodiment, the brewing device 102 establishes an environment 500 during operation to, among other things, remotely monitor status of the servers 106. The illustrative environment 500 includes a network connection manager 502, a brewing operation manager 504, a monitoring manager 506, and a user interface manager 508. As shown, the various components of the environment 500 may be embodied as hardware, firmware, software, or a combination thereof. As such, in some embodiments, one or more of the components of the environment 500 may be embodied as circuitry or collection of electrical devices (e.g., network connection circuitry, brewing operation circuitry, monitoring circuitry, and a user interface circuitry). It should be appreciated that, in such embodiments, one or more of the network connection manager 502, a brewing operation manager 504, a monitoring manager 506, and a user interface manager 508 may form a portion of the controller 200, the I/O subsystem 204, and/or other components of the brewing device 102. Additionally, in some embodiments, one or more of the illustrative components may form a portion of another component and/or one or more of the illustrative components may be independent of one another.

The network connection manager 502 is configured to establish a connection with other devices. For example, the network connection manager 502 is configured to establish a connection with one or more of the stands 104. In some embodiments, for example, the network connection manager 502 could use the Bluetooth™ low energy protocol to establish communications with multiple stands 104 within range of the brewing device 102. In some cases, the network connection manager 502 could be configured to use the master/slave framework of the Bluetooth™ protocol to establish communications between the brewing device 102 and the stands 104. For example, the brewing device 102 could establish an interface from which a user can search for remote stands 104. For example, the interface could be displayed on a screen of the brewing device 102 or on the mobile computing devices 114 connected to the brewing device 102. Once the search is complete, the user can select the stand(s) associate in the network to form the connection. Once the connection is established, the network connection manager 502 could manage communications between the brewing device 102 and the stands 104 to remotely monitor the servers 106.

In some embodiments, the network connection manager 502 may be configured to establish communications with one or more mobile computing devices 114. For example, the network connection manager 502 could establish a hotspot to which the mobile computing devices 114 can connect and establish communications with the brewing device 102. This can facilitate, for example, the mobile computing devices 114 to view status information regarding servers 106 remote from the brewing device 102 using the user interface manager 508.

The brewing operation manager 504 is configured to control brewing of a brewed beverage. For example, the brewing operation manager 504 may be configured to receive input of a recipe for a brewed beverage and control brewing components of the brewing device 102 to facilitate the brewing process for the brewed beverage.

The monitoring manager 506 is configured to monitor servers 106 corresponding to stands 104 connected to the brewing device 102. For example, the monitoring manager 506 could be configured to track status information about the servers 106 received from the stands 104, such as freshness time, empty status, recipe name, server/stand serial number, signal strength of stand, batch size, model (1.5 gallon vs. 1.0 gallon), stand location, etc. By way of example, the monitoring manager could store the status information about the servers 106 in memory 202.

The user interface manager 508 is configured to provide an interface to mobile computing devices 114 connected to the brewing device 102. For example, the user interface manager 508 could be configured to allow the mobile computing devices 108 to adjust settings for the brewing device 102, check on status of servers 106, and/or other functions. FIGS. 10-13 show an example user interface that could be provided by the user interface manager 508. In some cases, the user interface could be embodied as a webpage stored on the brewing device 102 or a database with information regarding server status to which an app on the mobile device interfaces when connected to the brewing device 102.

Figure 6:
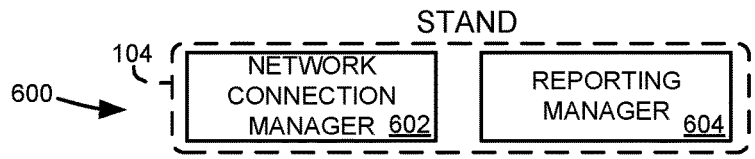
FIG. 6 is a simplified block diagram of various environments of a stand of FIG. 3.

Referring now to FIG. 6, in an illustrative embodiment, the stand 104 establishes an environment 600 during operation to, among other things, establish communications with the brewing device 102 and servers 106, and provide status information on servers 106. The illustrative environment 600 includes a network connection manager 602 and a reporting manager 604. As shown, the various components of the environment 600 may be embodied as hardware, firmware, software, or a combination thereof. As such, in some embodiments, one or more of the components of the environment 600 may be embodied as circuitry or collection of electrical devices (e.g., network connection circuitry and reporting circuitry). It should be appreciated that, in such embodiments, one or more of the network connection manager 602 and a reporting manager 604 may form a portion of the controller 300, the I/O subsystem 304, and/or other components of the stand 104. Additionally, in some embodiments, one or more of the illustrative components may form a portion of another component and/or one or more of the illustrative components may be independent of one another. For example, as discussed above, the server 106 may provide wireless reporting on status information directly to the brewer device 102. In such embodiments, all or part of the network connection manager 602 and/or reporting manager 604 may form part of the environment established by the server 106.

The network connection manager 602 is configured to establish a wireless connection with the brewing device 102. For example, the network connection manager 602 could be configured to use the Bluetooth™ low energy protocol to establish communications with a brewing device 102 within range of the stand 104. The network connection manager 602 could also be configured to establish one-way or two-way communications with one or more servers 106 connected to a power port of the stand 104 via power line communications. The stand 104 is able to obtain status information (and/or other information) from the server(s) 106 connected via the power port to the stand 104 using power line communications.

The reporting manager 604 is configured to send status updates regarding server(s) 106 connected to the power port of the stand 104 (or the reporting manager 604 embodied on the server 106 may send updates to the brewer device 102 directly). For example, the reporting manager 604 could be configured to periodically send status updates regarding server(s) 14 plugged into the stand's 104 power port to the brewing device 102. By way of example only, the stand 104 could send an update every few second, every minute, or in other intervals. Alternatively, or in addition to periodic updates, the reporting manager 604 could be considered to respond to queries from the brewing device 102 for status updates.

Figure 7:
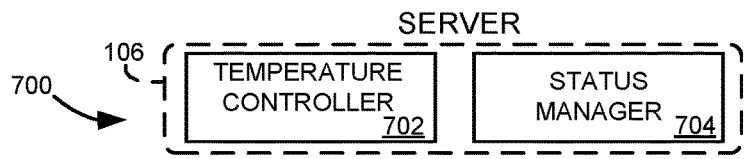
FIG. 7 is a simplified block diagram of various environments of a server of FIG. 4.

Referring now to FIG. 7, in an illustrative embodiment, the server 106 establishes an environment 700 during operation to, among other things, establish communications with the stand 104 to which the server 106 is connected (and, in some embodiments, communications with the brewer device 102 in embodiments with wireless reporting directly to the brewer device 102 from servers 106). The illustrative environment 700 includes a temperature controller 702 and a status manager 704. As shown, the various components of the environment 700 may be embodied as hardware, firmware, software, or a combination thereof. As such, in some embodiments, one or more of the components of the environment 700 may be embodied as circuitry or collection of electrical devices (e.g., temperature control circuitry and reporting circuitry). It should be appreciated that, in such embodiments, one or more of the temperature controller 702 and status manager 704 may form a portion of the controller 400, the I/O subsystem 404, and/or other components of the server 106. Additionally, in some embodiments, one or more of the illustrative components may form a portion of another component and/or one or more of the illustrative components may be independent of one another.

The temperature controller 702 is configured to control the temperature of the brewed beverage within the server 106, similar to the manner by which a thermostat operates. The status manager 704 is configured to provide status information regarding the server 106 to the stand 104 in which the server 106 is plugged in via power line communications. There is a variety of information that the status manger 704 could send to the stand 104, including but not limited to freshness time, empty status, recipe name, serial number, signal strength and/or location.

Figure 8:
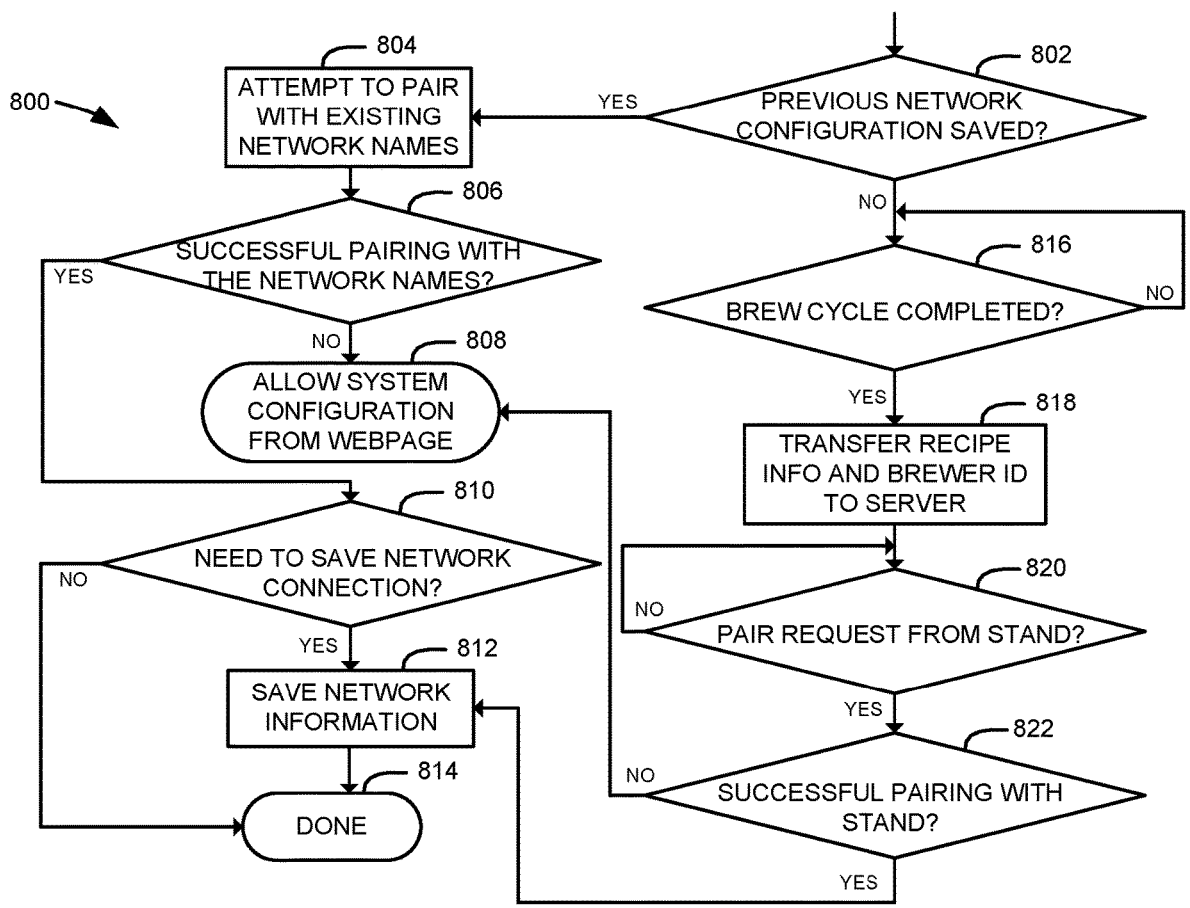
FIG. 8 is a simplified flow diagram of at least one embodiment of a method for establishing a network connection between a brewing device and a stand with the brewing device of FIG. 2.

Referring now to FIG. 8, in use, the brewing device 102 may execute a method 800 for connecting with one or more stands 104. It should be appreciated that, in some embodiments, the operations of the method 800 may be performed by one or more components of the environment 500 of the brewing device 102 as shown in FIG. 5. The method 800 begins in block 802, which could be performed upon power-up of the brewing device 102 or upon selecting a connection button on the brewing device 102 or other initiating action, the brewing device 102 determines whether a previous network configuration is saved in memory 202. If a prior network configuration is found in memory 202, the method 800 advances to block 804 in which the brewing device 102 attempts to connect with one or more stands 104 based on the saved network configuration. Next, a determination is made whether a connection was successfully established (block 806). If the brewing device 102 is unable to connect successfully, the method 800 proceeds to block 808 in which user can attempt to manually configure the network connection using the user interface, such as shown in FIGS. 10-13. If the brewing device 102 is able to successfully connect to one or more servers 106, the method 800 advances to block 810 in which a determination is made whether any network information should be saved to memory 202. If so, the method proceeds to block 812 in which network information is saved in memory 202. If there is no need to save network information, the method 800 proceeds to block 814 in which the method ends until another connection is desired.

Referring again to block 802, if there is not a previous network configuration already stored in memory 202, the method 800 advances to block 816 in which a determination is made whether a brew cycle has been completed. If not, the method 800 waits for the brew cycle to complete. Once a brew cycle has completed, the method 800 advances to block 818 in which data regarding the brew (and possibly other information) is transferred to memory 402 in the server 106. For example, the brewing device 102 could transfer recipe information, an identification of the brewing device that dispensed the brewed beverage into the server 106, a time for completion of the brew, etc., to the server 106. The method 800 then proceeds to block 820 in which the brewing device 102 waits for a pair request from one or more stands 104 within range. When a pair request is received from a stand 104, the method 800 progresses to block 822 in which a determination is made whether the connection was successfully established. If so, the network configuration information is saved in memory 202. If the pairing is unsuccessful, the method 800 advances to block 808 in which the user can attempt to manually configure the connection using a mobile computing device 114.

Figure 9:
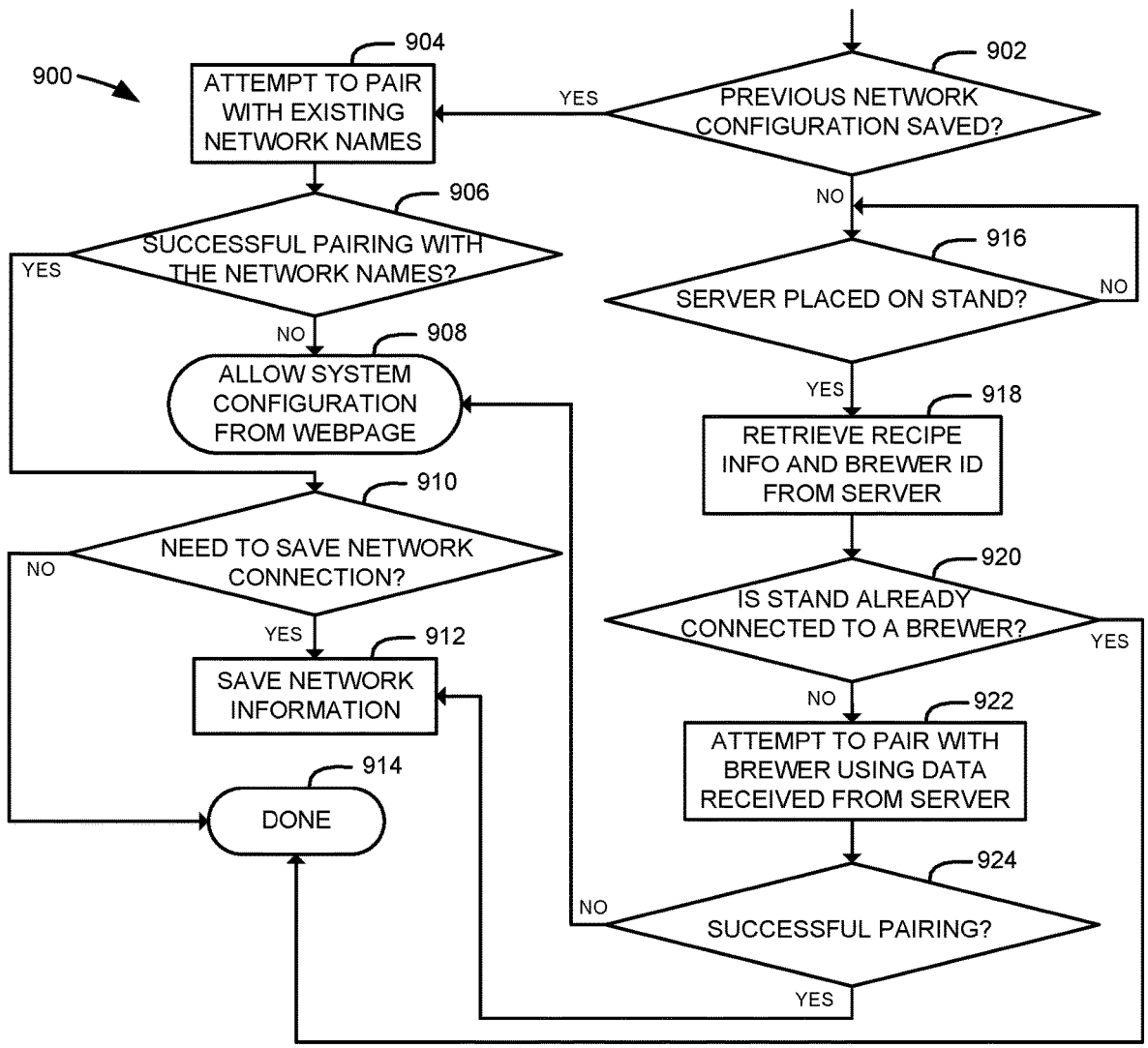
FIG. 9 is a simplified flow diagram of at least one embodiment of a method for establishing a network connection between a stand and a brewing device with the stand of FIG. 3.

Referring now to FIG. 9, in use, the stand 104 may execute a method 900 for connecting with one or more stands 104. It should be appreciated that, in some embodiments, the operations of the method 900 may be performed by one or more components of the environment 600 of the stand 104 as shown in FIG. 6. In some embodiments in which servers 106 report status updates directly to the brewer device 102, the servers 106 may execute all or a part of the operations in the method 900 for connecting the servers 106 to the brewer device 102. In the embodiment shown, the method 900 begins in block 902, which could be performed upon power-up of the stand 104 or upon selecting a connection button on the stand 104 or other initiating action, the stand 104 determines whether a previous network configuration is saved in memory 302. For example, the previous network configuration could include the Bluetooth™ name of a brewer to which the stand 104 has connected. In embodiments in which the servers 106 directly report status updates to the brewer device 102, the block 902 may be performed by the server 106 upon plugging in the server 106 into the power port on the stand 104 or otherwise upon power-up of the server 106. If a prior network configuration is found in memory 302, the method 900 advances to block 904 in which the stand 104 attempts to connect with a brewing device 102 based on the saved network configuration. Next, a determination is made whether a connection was successfully established (block 906). If the stand 104 is unable to connect successfully with a brewing device 102, the method 900 proceeds to block 908 in which user can attempt to manually configure the network connection using the user interface, such as shown in FIGS. 10-13. If the stand 104 is able to successfully connect to a brewing device 102, the method 900 advances to block 910 in which a determination is made whether any network information should be saved to memory 302. If so, the method proceeds to block 912 in which network information is saved in memory 302. If there is no need to save network information, the method 900 proceeds to block 914 in which the method ends until another connection is desired.

Referring again to block 902, if there is not a previous network configuration already stored in memory 302, the method 900 advances to block 916 in which a determination is made whether a server 106 has been placed on the stand 104. If not, the method 900 waits for a server 106 to be placed on the stand 104. Once a server 106 has been placed on the stand 104, and plugged in to a power port, the method 900 advances to block 918 in which data regarding the server, such as recipe info, brewer ID, brew time (and possibly other information) is retrieved by the stand 104 from the server 106. The method 900 then proceeds to block 920 in which the stand 104 determines whether there is already an active connection to a brewing device 102. If the stand is already connected to a brewing device 102, the method 900 proceeds to block 914. If no active connection is already ongoing, the method 900 continues to block 922 in which the stand 104 attempts to pair with a brewing device 102 based on information retrieved from the server 106, such as a brewer identification for Bluetooth™ pairing stored in memory 402 of the server 106, which has been retrieved by the stand 104. In embodiments in which the servers 106 include the wireless communication subsystem 408, and directly report status updates to the brewer device 102, the server 106 could establish a connection with the brewer ID data transferred from the brewer device 102 and stored in memory. As discussed herein, Next, the method 900 progresses to block 924 in which a determination is made whether the connection was successfully established. If so, the network configuration information is saved in memory 302 of the stand 104. If the pairing is unsuccessful, the method 900 advances to block 908 in which the user can attempt to manually configure the connection using a mobile computing device 114.

FIGS. 10-13 illustrate an example interface that could be accessed by one or more mobile devices to view and/or adjust certain parameters of the brewing device 102, stand 104, and/or server 106. In some embodiments, at least a portion of the interface could be displayed on a screen of the brewing device 102, stands 104, and/or server 106. In the example shown, there is a tab for selecting a dashboard 1000, a tab for selecting system settings 1002, a tab for selecting Wi-Fi settings 1004, and a tab for selecting browser network settings 1006.

For example, the first time the brewing device 102 is powered, the brewing device 102 could establish a Wi-Fi hotspot in which the default network name could have a unique name, such as a predetermined prefix word or phrase with a portion of the brewing device's 102 serial number or other identifier. The brewing device 102 could be configured to establish a default password for the network, such as a predetermined word or phrase. Once the mobile computing devices 114 connect to the Wi-Fi hotspot, such as using a browser 118, the interface could be provided by having the mobile computing devices 114 enter a default server address into the browser 118, such as a predetermined IP address, such as 192.168.1.1. Once the mobile computing devices 114 access the interface, such as the example shown in FIGS. 10-13, with the browser 118, the user can update default parameters, such as the network name, password, etc.

Figure 10:
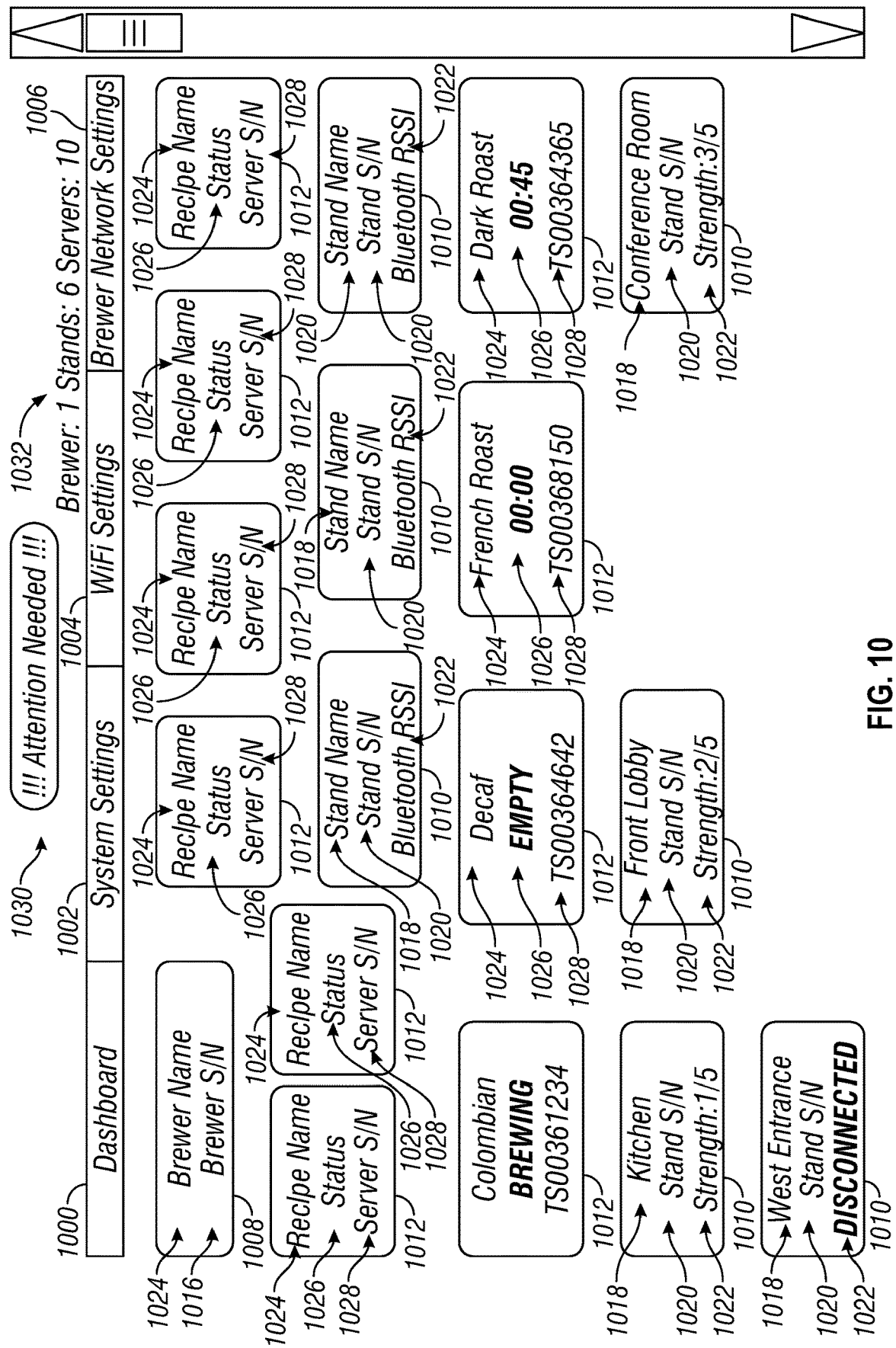
FIG. 10 is at least one embodiment of a dashboard user interface established by the brewing device of FIG. 2.

FIG. 10 shows an example dashboard that could be provided by the interface to view the status of the brewing device 102, stand 104, and/or server 106 upon selecting the dashboard tab 1000. Typically, the dashboard view would show each stand 104 that has previously connected (or is currently actively connected) with the brewing device 102 and servers 106 associated with each of those stands 104. In the example shown, the interface includes a brewing device interface element 1008, a plurality of stand interface elements 1010, and a plurality of server interface elements 1012. As shown, the brewing device interface element 1008 includes a brewer name 1014 and a brewer serial number 1016; other information could be included in the brewing device interface element 1008 depending on the circumstances.

In the embodiment shown, the plurality of stand interface elements 1010 include a stand name 1018, a stand serial number 1020, and a signal strength indicator 1022 (e.g., Bluetooth™ RSSI), but other information could be included in the stand interface elements 1010 depending on the circumstances. In some cases, the stand name 1018 could be the location, such as kitchen, front lobby, or conference room, in which the stand is placed. In the example shown, the stand interface elements 1010 are spatially arranged with respect to server interface elements 1012 to indicate which servers 106 are connected to power ports of stands 104. As shown, the servers connected with stands have server interface elements 1012 aligned above the corresponding stand interface elements 1012 along a vertical axis. In some embodiments, the size of the interface elements could vary depending on the corresponding device. For example, as shown, the stands 104 with dual ports for connecting two servers 106 are shown with stand interface elements 1010 that are twice as wide as stands 104 with a single port for connecting a single server 106. Various colors, flashing indicators or other elements could be used based on status of the brewing device 102, stands 104, and/or servers 106. For example, a server interface element corresponding to a server 106 that is empty could have text flashing "Empty" in red; by way of another example, a freshness time that has reached zero could be shown with "00:00" flashing in red.

In the example shown, the plurality of server interface elements 1012 include a server name 1024, a status indicator 1026, and a server serial number 1028; depending on the circumstances, other information could be provided in the server interface element 1012. In the example shown, the server name 1024 is the recipe for the brewed beverage contained within the server 106 (e.g., decaf, French roast, dark roast, etc.), which could be included in data transferred from the brewing device 102 as described herein. The status indicator 1026 could indicate a variety of status information about the server 106; in the example shown, the status indicator 1026 could indicate that the server 106 is brewing, empty status (i.e., if the server no longer contains brewed beverage), freshness status (e.g., elapsed time since brewing), or other information. In the example shown, the dashboard includes a warning indicator 1030 that denotes attention is needed regarding one of the stands 104 and/or servers 106, such as a server 104 is empty or a brewed beverage is no longer fresh. Additionally, in the example shown, the dashboard includes a connection status indicator 1032 with a list of brewing devices, stands, and servers connected.

Figure 11:
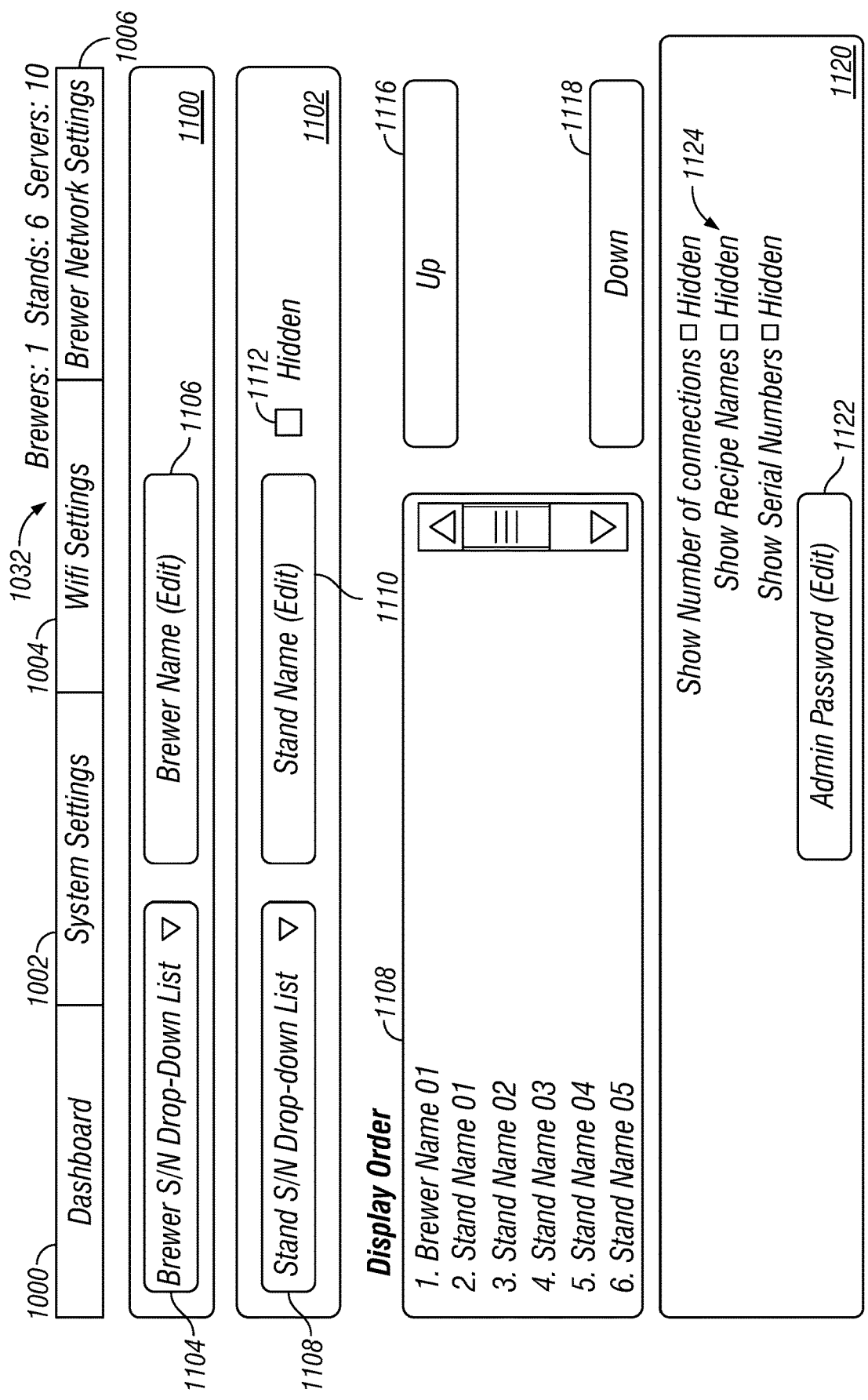
FIG. 11 is at least one embodiment of a system settings user interface established by the brewing device of FIG. 2.

FIG. 11 illustrates the example user interface upon selecting the system settings tab 1002. In the example shown, the interface includes a brewer parameter editing element 1100 and a stand parameter editing element 1102. The brewer parameter editing element 1100 and the stand parameter editing element 1102 are configured to allow a user to edit one or more parameters associated with a brewing device 102 and stands 104, respectively. As shown, the brewer parameter editing element 1100 includes a list of brewing devices 1104 associated with the interface and a name editing element 1106 that allows the user to edit names of brewing device(s) as shown in the dashboard, and the stand parameter editing element 1102 includes a list of stands 1108 associated with the interface and a name editing element 1110 that allows the user to edit names of stand(s) as shown in the dashboard. In some cases, other parameters, such as a hidden parameter 1112 that hides the stand from the dashboard, can be included.

In the embodiment shown, the interface includes an ordering element, which as shown, includes an ordered list 1114 of brewing devices, stands, and/or servers. In this example, the user can select an item from the ordered list 1114 and then select up 1116 or down 1118 to adjust the relative positions of the items for the dashboard shown in FIG. 10. A user can use this interface to configure to order of which brewing devices 102 and stands 104 will be displayed on the dashboard. One set, the brewing device 102 will save the configuration and will retain the information on every power cycle. As shown, the interface includes an administrative portion 1120 in which a password portion 1122 can lock adjustments to the parameters, such as requiring a password to access the system settings, Wi-Fi settings, and network settings tabs 1002, 1004, 1006. As shown, another adjustment portion 1124 is for changing what is shown on the dashboard.

Figure 12:
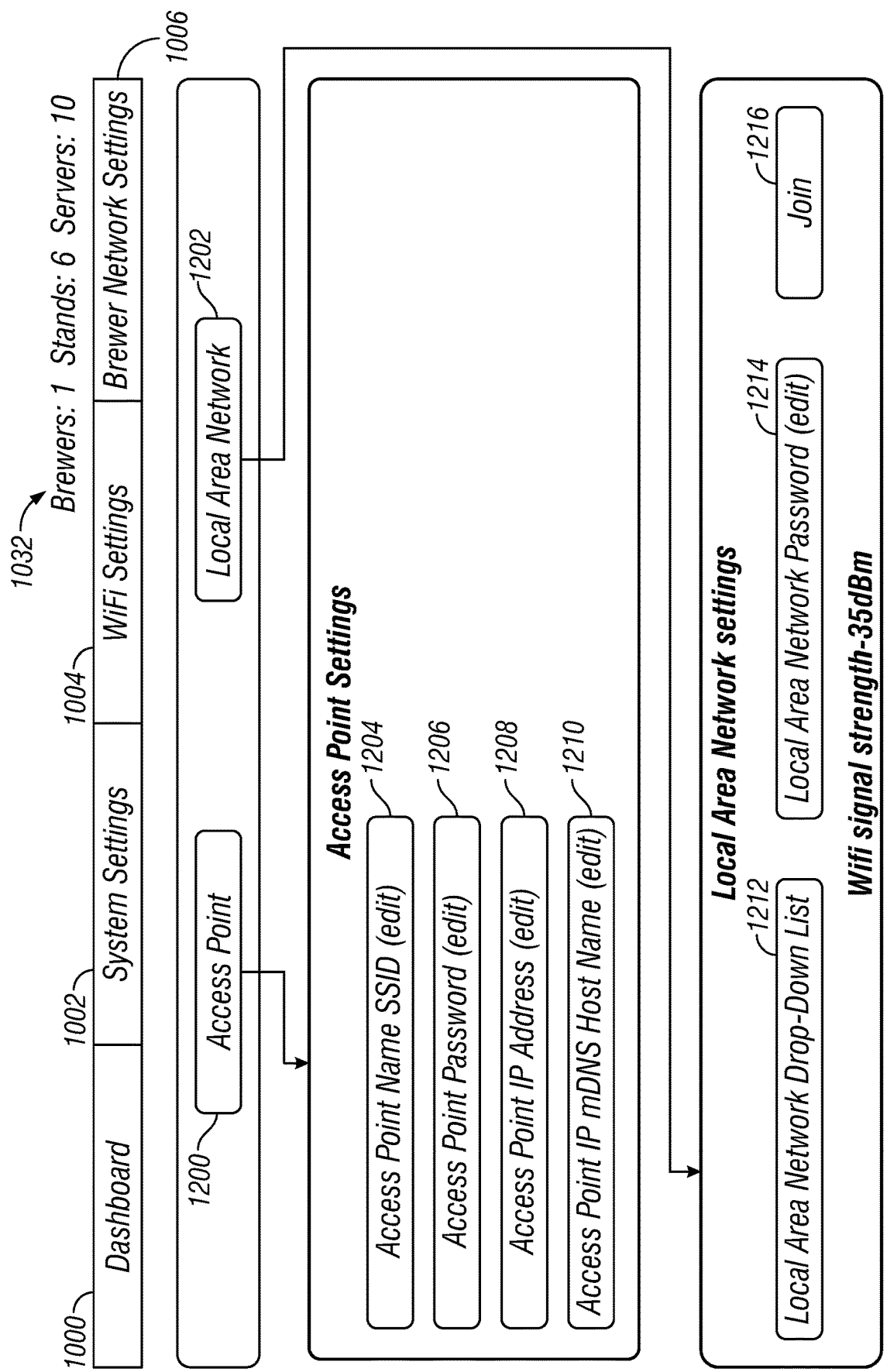
FIG. 12 is at least one embodiment of a Wi-Fi settings user interface established by the brewing device of FIG. 2.

FIG. 12 illustrates an interface that may be shown upon selecting the Wi-Fi settings tab 1004. This interface facilitates customization and securing of the Wi-Fi network established by the brewing device 102. In the embodiment shown, the interface includes an access point option 1200 and a local area network option 1202. Upon selecting the access point option 1200, the user is presented with options to edit/configure the access point name (SSID) 1204, access point password 1206, access point IP address 1208, and access point IP mDNS host name 1210 (e.g., http://www.S- martBrewer.com). If the user selects the local area network option 1202, the user is presented with options to search and join a local network, such as using a local area network search element 1212, password element 1214, and a join element 1216.

Figure 13:
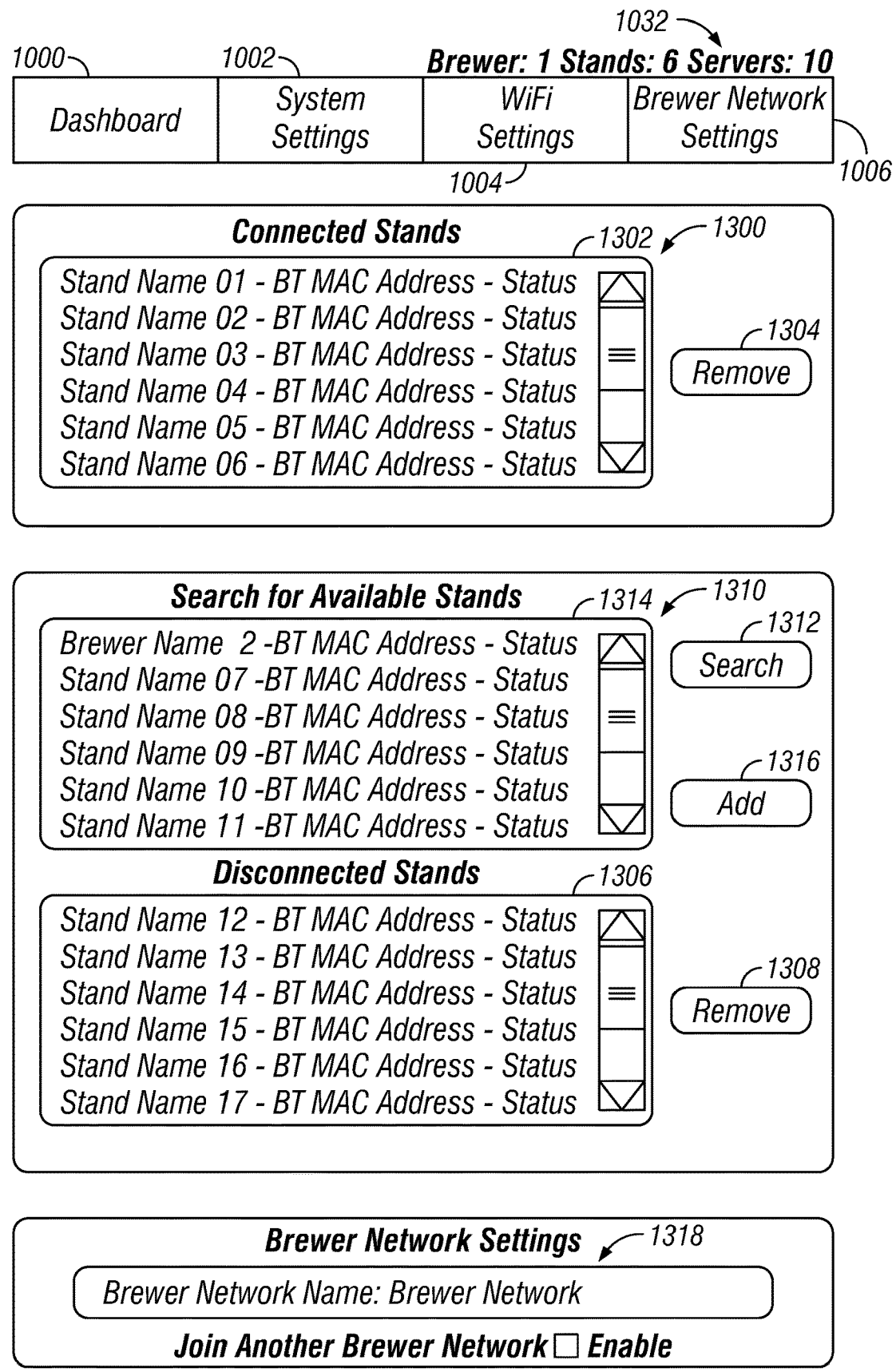
FIG. 13 is at least one embodiment of a network settings user interface established by the brewing device of FIG. 2.

FIG. 13 illustrates an interface that may be shown upon selecting the network settings tab 1006. This interface facilitates configuring the brewer network, and shows the current status of stands 104 that are joined in the network; from this interface, the user will be able to search for new stands 104 and/or disconnect from current stands 104. In this example, there is a stand delete interface 1300 configured to allow a user to remove a stand 104 from the network. In the example shown, the interface includes a connected stand list 1302 with a list of each stand 104 that has connected to the brewing device 102. Upon selecting a stand 104 from the stand list 1302, the user can select the disconnect element 1304 to disconnect that stand from the stand list 1302 and remove that stand from memory 302, which means the brewing device 102 will no longer be connected to that stand 104 when that stand 104 is in range. As shown, there is similar disconnected stand list 1306, which identifies a remote stands that the brewing device 102 can no longer find. A user can select a stand from the list 1306 and then remove that stand 104 by selecting the remove element 1308, which means the brewing device 102 will no longer attempt to search for and connect to that stand. If a stand 104 does not get removed, it will be displayed on the dashboard, but will have an indication of "Disconnected" where the RSSI gets displayed. In the embodiment shown, there is a stand manual connect portion 1310 from which a user can search for stands 104 within range of the brewing device 102 using the search element 1312, which populates a list of available stands 1314 within a communication distance of the brewing device 102. In this example, the user can select a stand from the list of available stands 1314 and then add that stand to the network with the add element 1316. Once connected, the dashboard will show the status of the stand 104 and server(s) 106 connected to the stand 104.

As shown, there is an interface element 1318 for enabling the brewing device 102 to join another brewer network. If joining another brewer network is enabled, the brewing device 102 will change its Bluetooth™ configuration similar to a stand 104 and drop all other Bluetooth™ connections. The host brewer (to which the brewing device 102 connects), will then need to search for the brewing device 102 in order to add it to the brewer network. This option would typically only be used in the scenario when multiple brewers are present and all of the information needs to be displayed in one wireless Wi-Fi network; although not required in a multiple brewer setup, it could be used when multiple wireless Wi-Fi and Bluetooth™ networks could cause confusion.

FIG. 14 illustrates an embodiment in which one or more servers 1400 include a wireless beacon 1401, such as a Bluetooth™ beacon, to wirelessly transmit a server identifier that identifies a respective server from the other servers 1400, along with one or more status indicators of that respective server, such as freshness time, empty status, hold temperature, recipe name, serial number, signal strength, batch size, model (e.g., 1.5 gallon vs. 1.0 gallon), power level, and/or other characteristics of the server and/or the beverage carried by the server, directly to a brewing device 1402 without needing to rely on a server stand for wireless communications. For example, the wireless beacon 1401 may be configured to periodically transmit status indicators with the server identifier, such as multiple times per second depending on the circumstances.

The wireless beacon 1401 may be embedded within the body of the server 1400, internal to the body of the server 1400, attached to the body of the server 1400, such as via adhesive or fastener(s). In some embodiments, the servers 1400 may be battery powered; depending on the circumstances, the servers 1400 could be powered through a connection with another power source, such as a server station, a wall outlet, etc.

In the embodiment shown in FIG. 14, there are four servers 1400, but depending on the circumstances, there could be more or less servers 1400. There is shown a single brewing device 1402 for purposes of example, but more than one brewing device 1402 could be provided depending on the circumstances. In some circumstances, the brewing device 1402 may include a display to provide at least a portion of the status indicators of the servers 1400. For example, in some embodiments, the display may be a touch interface through which a user could interact, such as the user interface shown in FIGS. 10-13.

In some cases, the brewing device 1402 may make the servers' status indicators received from the wireless beacon 1401 available to local devices 1404 for substantial real-time remote monitoring, such as through a WiFi connection with the brewing device 1402 as described herein. For example, the local device(s) 1404, could be a phone, tablet or other computing device, that connects to the brewing device 1402 via WiFi or other wireless local network connection. For example, the local device(s) 1404 may be programmed to display digital sight gauges of real-time status information regarding the servers 1400 received from the brewing device 1402. In some cases, the local device(s) 1404 may display a user interface similar to that show with respect to FIGS. 10-13. For example, the local device(s) 1404 may connect with the brewing device 1402 with a browser or other app to receive the data from the brewing device 1402. There is shown a single local device 1404 for purposes of example, but more than one local device 1404 could be provided depending on the circumstances.

In some embodiments, the brewing device 1402 may be connected to an access point or another network component, such as BUNNlink™ by Bunn-O-Matic Corporation of Springfield, Illinois, to make the servers' status indicators available for substantial real-time remote monitoring to any remote devices 1406 connected to the cloud 1406, such as the Internet, or other data connection. For example, in some cases, any remote device 1406 may be perform substantial real-time remote monitoring of the server(s) 1400 from any location. There is shown a single remote device 1406 for purposes of example, but more than one remote device 1406 could be provided depending on the circumstances.

EXAMPLES

Illustrative examples of the technologies disclosed herein are provided below. An embodiment of the technologies may include any one or more, and any combination of, the examples described below.

Example 1 is a stand for a brewed beverage server. The stand includes a platform for holding a brewed beverage server. There is at least one power port configured to supply power a brewed beverage server connected to the at least one power port. The stand has a power line communication subsystem configured to establish data communications with the brewed beverage server connected to the at least one power port to receive one or more status updates regarding the brewed beverage server. The stand includes a wireless communication subsystem configured to establish wireless communications with a remote brewing device. Also, there is a controller programmed to wirelessly send one or more of the status updates regarding the brewed beverage server received via the power line communication subsystem to the remote brewing device with the wireless communication subsystem.

Example 2 includes the subject matter of Example 1, and wherein: the status updates include one or more of an empty status of the brewed beverage server or a freshness status of the brewed beverage server.

Example 3 includes the subject matter of Examples 1-2, and wherein: the controller is configured to attempt pairing with the remote brewing device based on data received from the brewed beverage server over the power line communication subsystem.

Example 4 includes the subject matter of Examples 1-3, and wherein: the data received from the brewed beverage server over the power line communication system includes a network identification of the remote brewing device.

Example 5 includes the subject matter of Examples 1-4, and wherein: the wireless communication subsystem is configured to establish a wireless pairing using the network identification of the remote brewing device received over the power line communication.

Example 6 includes the subject matter of Examples 1-5, and wherein: the controller is configured to store the network identification of the remote brewing device in response to a successful pairing.

Example 7 is a brewing device with a network connection manager, a brewing operation manager, a monitoring manager, and a user interface manager. The network connection manager is configured to establish a wireless network connection with one or more mobile computing devices and one or more remote stands. The brewing operation manager is configured to facilitate brewing of a brewed beverage. The monitoring manager is configured to receive one or more status updates from the one or more remote stands and/or brewers regarding one or more brewed beverage servers. The user interface manager is configured to establish a user interface from which the one or more mobile computing devices can view the one or more status updates regarding the one or more brewed beverage servers.

Example 8 includes the subject matter of Example 7, and wherein: the user interface is configured to provide one or more of an empty status of the brewed beverage server or a freshness status of the one or more brewed beverage servers.

Example 9 includes the subject matter of Examples 7-8, and wherein: the user interface is configured to include an alert in response of the empty status.

Example 10 includes the subject matter of Examples 7-9, and wherein: the user interface is configured to include an alert in response to the freshness status.

Example 11 includes the subject matter of Examples 7-10, and wherein: the user interface includes an interface element to search for one or more stands and/or brewers within a communication range of the brewing device.

Example 12 includes the subject matter of Examples 7-11, and wherein: the user interface is configured to generate a graphical user interface with the one or more servers arranged with regard to the one or more stands based on network connections.

Example 13 includes the subject matter of Examples 7-12, and wherein: the network connection manager is configured to establish a wireless hotspot for connection by one or more mobile computing devices within range of the brewing device.

Example 14 includes the subject matter of Examples 7-13, and wherein: the user interface is configured to provide a location of the one or more stands.

Example 15 is a server for a brewed beverage. The server includes a container defining a chamber dimensioned to receive a brewed beverage. There is a power cord configured to plug into a power port of a stand to supply electrical power to the server. The server has a controller, a power line communication subsystem and/or a wireless communication subsystem. The controller is configured to control a temperature of the brewed beverage in the chamber. The power line communication subsystem is configured to establish data communications with the stand over the power cord. The wireless communication subsystem is configured to wirelessly transmit one or more updates to the remote brewer device regarding the status.

Example 16 includes the subject matter of Example 15, and wherein: the controller is configured to send a network identifier of a remote brewing device to the stand over the power line communication subsystem.

Example 17 includes the subject matter of Examples 15-16, and wherein: the controller is configured to periodically send status updates to the stand over the power line communication subsystem.

Example 18 includes the subject matter of Examples 15-17, and wherein: the status updates include an indication whether the chamber is empty.

Example 19 includes the subject matter of Examples 15-18, and wherein: the status updates include an indication how long since the brewed beverage in the chamber was brewed.

The invention claimed is:

1. A beverage status communication system comprising:
a brewing device configured to brew a brewed beverage;
a brewed beverage container configured to hold the brewed beverage, wherein the brewed beverage container includes a wireless beacon configured to wirelessly broadcast a container identifier and one or more status indicators of the brewed beverage container to the brewing device;
wherein the brewing device is configured to receive the container identifier and the one or more status indicators of the brewed beverage container when the brewing device is within a signal range of the wireless beacon;
wherein the brewing device includes a display and is configured to identify the container identifier and the one or more status indicators of the brewed beverage container received from the wireless beacon on the display, wherein the display of the brewing device includes a user interface from which the container identifier and the one or more status indicators of the brewed beverage container can be viewed for substantially real-time monitoring of the brewed beverage container, wherein the user interface is configured to provide an empty status and/or a freshness status of the brewed beverage container, and include an alert in response to the empty status and/or the freshness status; and
further comprising a second brewed beverage container with a second wireless beacon configured to broadcast a second container identifier and one or more status indicators of the second brewed beverage container, wherein the user interface is configured to generate a graphical user interface with the container identifier and the one or more status indicators of the brewed beverage container and the second container identifier and one or more status indicators of the second brewed beverage container.

2. The beverage status communication system of claim 1, wherein the wireless beacon is a Bluetooth beacon.

3. The beverage status communication system of claim 1, wherein the wireless beacon communicates directly with the brewing device.

4. The beverage status communication system of claim 1, wherein the one or more status indicators of the brewed beverage container include one or more characteristics of the brewed beverage container and/or the beverage carried by the brewed beverage container.

5. The beverage status communication system of claim 4, wherein the one or more status indicators of the brewed beverage container include one or more of freshness time, empty status, hold temperature, recipe name, serial number, signal strength, batch size, container model type, and/or power level.

6. The beverage status communication system of claim 1, wherein the brewed beverage container is configured to directly broadcast the container identifier and the one or more status indicators of the brewed beverage container to the brewing device.

7. The beverage status communication system of claim 6, wherein the brewed beverage container is configured to periodically broadcast the container identifier and the one or more status indicators of the brewed beverage container multiple times per second.

8. The beverage status communication system of claim 1, wherein the wireless beacon is embedded within a body of the brewed beverage container.

9. The beverage status communication system of claim 1, wherein the wireless beacon is attached to a body of the brewed beverage container.

10. The beverage status communication system of claim 1, wherein the brewed beverage container includes one or more batteries to power the wireless beacon.

11. The beverage status communication system of claim 1, wherein the user interface is configured to enable one or more of adding, deleting and/or adjusting a spatial arrangement of elements representing the brewed beverage container and the second brewed beverage container on the user interface.

\* \* \* \* \*